(12) United States Patent
Green

(10) Patent No.: US 6,619,510 B2
(45) Date of Patent: Sep. 16, 2003

(54) BULK DISPENSER APPARATUS

(76) Inventor: Scott David Green, 604 Ridge Rd., Birmingham, AL (US) 35206

( * ) Notice: Subject to any disclaimer, the term of this patent is extended or adjusted under 35 U.S.C. 154(b) by 0 days.

(21) Appl. No.: 09/961,199

(22) Filed: Sep. 25, 2001

(65) Prior Publication Data

US 2003/0057233 A1 Mar. 27, 2003

(51) Int. Cl.$^7$ ................................ B67D 5/06
(52) U.S. Cl. ............... 222/185.1; 222/154; 222/444; 141/360; 141/362
(58) Field of Search ................ 141/351, 352, 141/360, 362, 363, 364, 365, 366; 222/154, 185.1, 444, 453, 108

(56) References Cited

U.S. PATENT DOCUMENTS 2,385,600 A * 9/1945 Banua ........................ 222/248
2,532,698 A * 12/1950 Corkins ...................... 222/139
5,437,393 A * 8/1995 Blicher et al. ................ 222/77
5,463,877 A * 11/1995 Young et al. ................. 62/264
6,199,724 B1 * 3/2001 Yeranossian ................ 222/154

* cited by examiner

Primary Examiner—Timothy L. Maust
(74) Attorney, Agent, or Firm—Kenneth M. Bush; Robert M. Jackson; Bush IP Law Group, LLC

(57) ABSTRACT

A bulk dispensing apparatus uses a number of storage units for dispensing granular food products, i.e. candy, coffee, sugar, food supplements, etc. Each storage unit has a discharge hole with a valve operatively connected to the hole. The valve is attached at a dispensing station above a catch basin, which catches the minimal spillage. By using a number of variously colored and flavored granular products, specifically candy, a creative, decorative, edible art form in a clear container is easily fashioned and saved.

20 Claims, 11 Drawing Sheets

BULK DISPENSER APPARATUS

FIELD OF THE INVENTION

The present invention relates to the field of dispensing granular products, and more particularly, to devices for dispensing a user-determined amount of granular products stored in bulk in a plurality of individual, removable storage bottles.

BACKGROUND OF THE INVENTION

The present invention relates to a unique apparatus for filling receptacles with granular products, which may flow from single source containers. Dispensing mechanisms have long been known. They range from open containers that are common in bulk stores to coin-operated machines such as candy machines. Both of the above mentioned utilities are prone to contamination—especially the bulk container where the end users manipulate the product with a scoop. The handling of the food products by the public submits the enclosed product to contaminants. The gumball machine is much more difficult to sanitize than the bulk containers, but it is also a mechanically complex machine making it difficult to maintain for the personal user. For that reason, the end user can be deprived of any amusement, fun, and even candy from such dispensing machines.

The idea of candy art is similar to that referred to in Green, U.S. Pat. No. 6,047,746. That particular mechanism is used to create sand art. Candy art, although similar in idea, is much better because the kids have art they can eat. This mechanism is interactive, involving the users' creativity, imagination, and playfulness. It brings back a sense of nostalgia for adult users similar to other powder products that have been around for years.

Accordingly, there is a need for a granular products dispenser that is easy, fun, user-friendly, owner-friendly, interactive, and that amuses the user.

SUMMARY OF THE INVENTION

In accordance with the present invention a novel and useful apparatus for filling receptacles or containers with granular products is herein provided.

It is an object of this invention to provide an easy, clean, fun, and entertaining way to dispense granular products.

Yet another object of this invention is to provide controlled flow of the granular products, thereby reducing waste.

These and other objects of the invention are accomplished by the use of a plurality of storage containers for the granular product, a discharge orifice and a valve connected to the orifice for each container. The present invention provides a bulk dispensing apparatus for dispensing user-determined amounts of granular products stored in bulk in a plurality of individual, removable storage bottles. Each bottle is connected to a dispensing mechanism containing a manually-operated valve. In non-dispensing mode a spring slide is relaxed, and in dispensing mode it is stressed. The valve is positioned such that the user-defined amount of product passes through the discharge orifice upon compression of the push shaft, which opens the valve. The dispensing apparatus is attached to a main body, from which the storage bottles can be quickly removed to sanitize. The main body is generally upright, and mounted to another surface, i.e. walls, tables, cabinets, mobile cart, storage case/cart, etc.

These and other objects and advantages of the invention will become apparent from the following detailed description of the preferred embodiment of the invention and the accompanying drawings.

BRIEF DESCRIPTION OF THE DRAWINGS

A granular products dispensing apparatus embodying the features of the present invention is depicted in the accompanying drawings which form a portion of this disclosure and wherein.

DESCRIPTION OF THE PREFERRED EMBODIMENT

Figure 1:
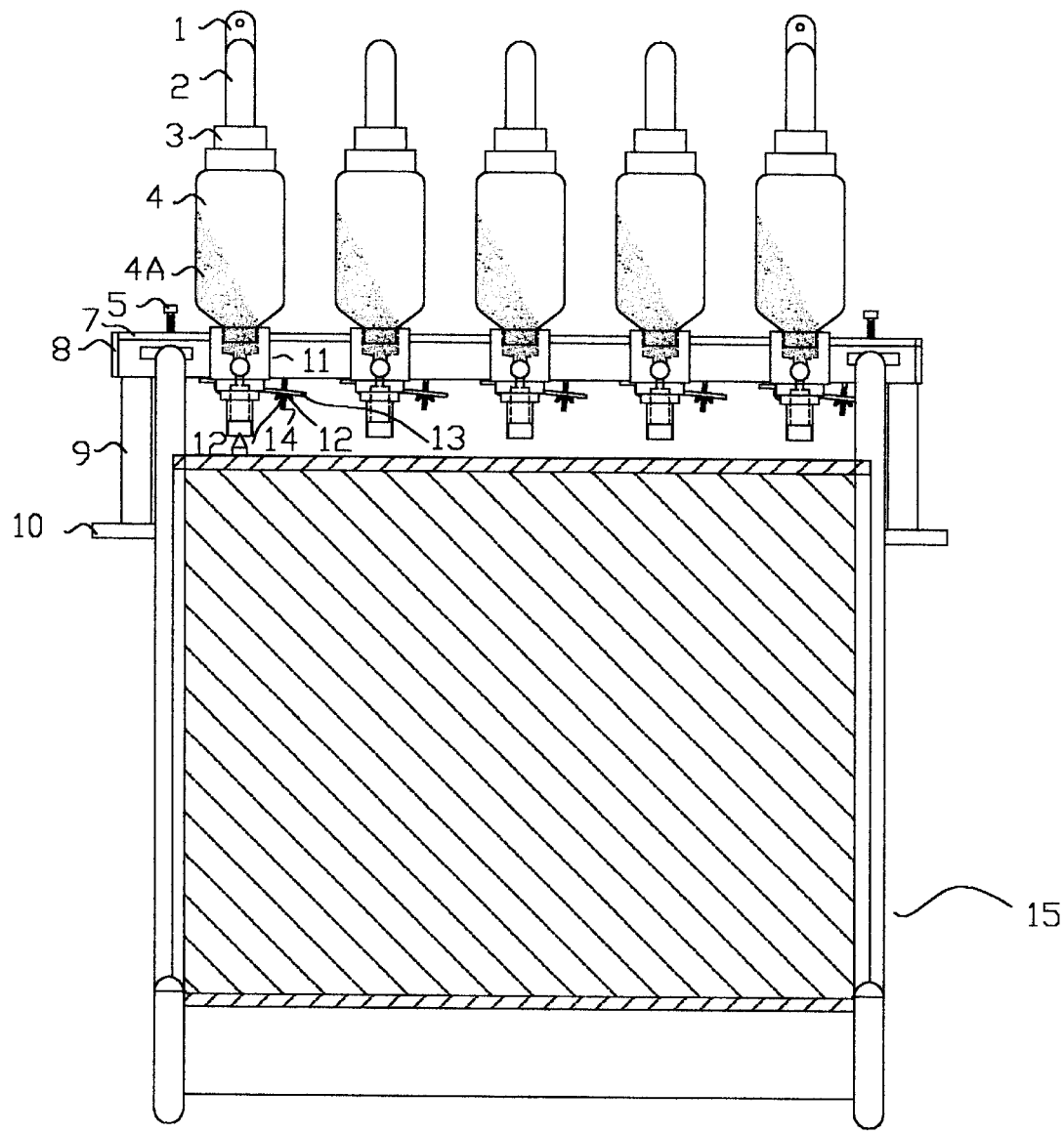
FIG. 1 is a front elevational view of a five push button mechanism dispensing machine.
Figure 2:
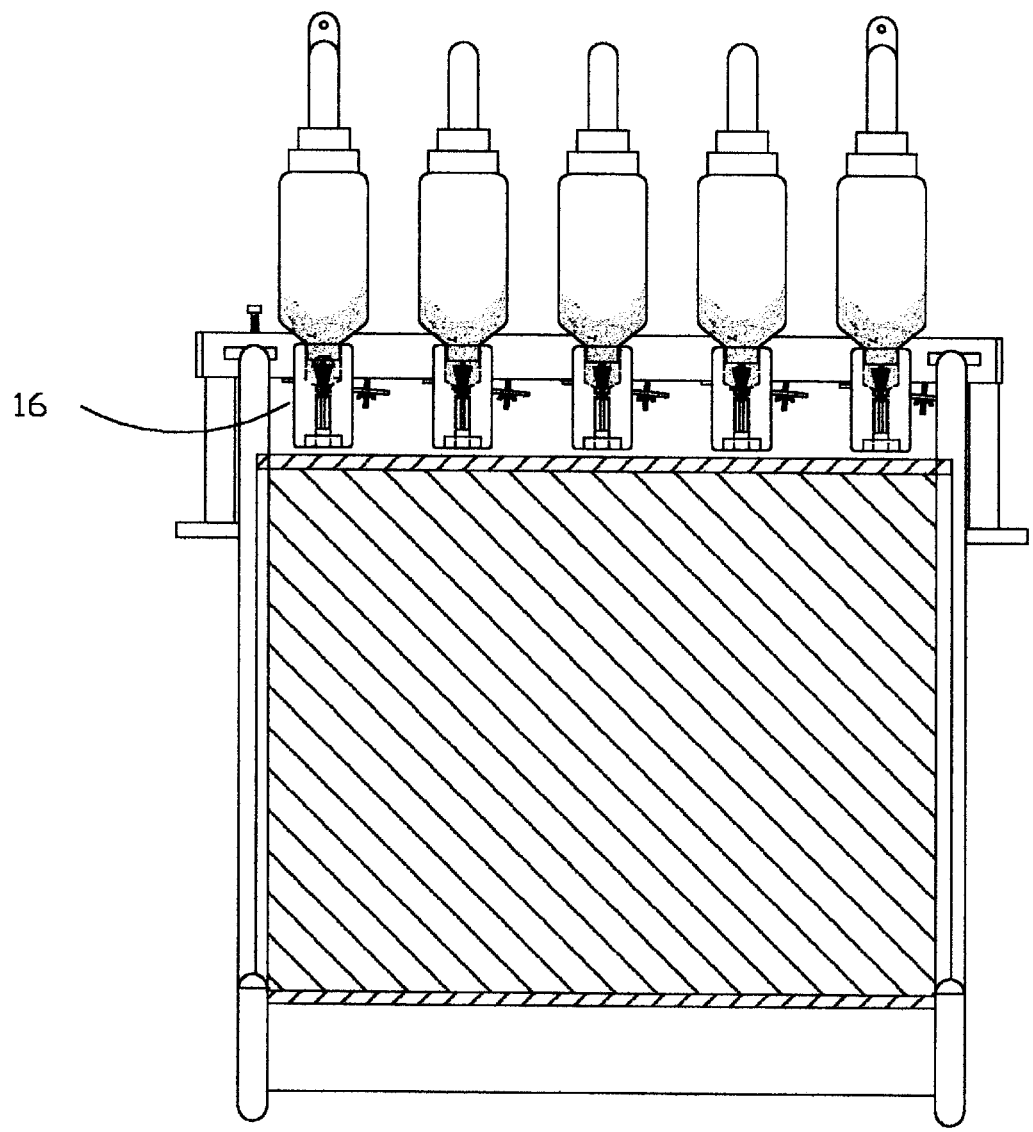
FIG. 2 is a front elevational view of a five vertical dispense mechanism dispensing machine.
Figure 5:
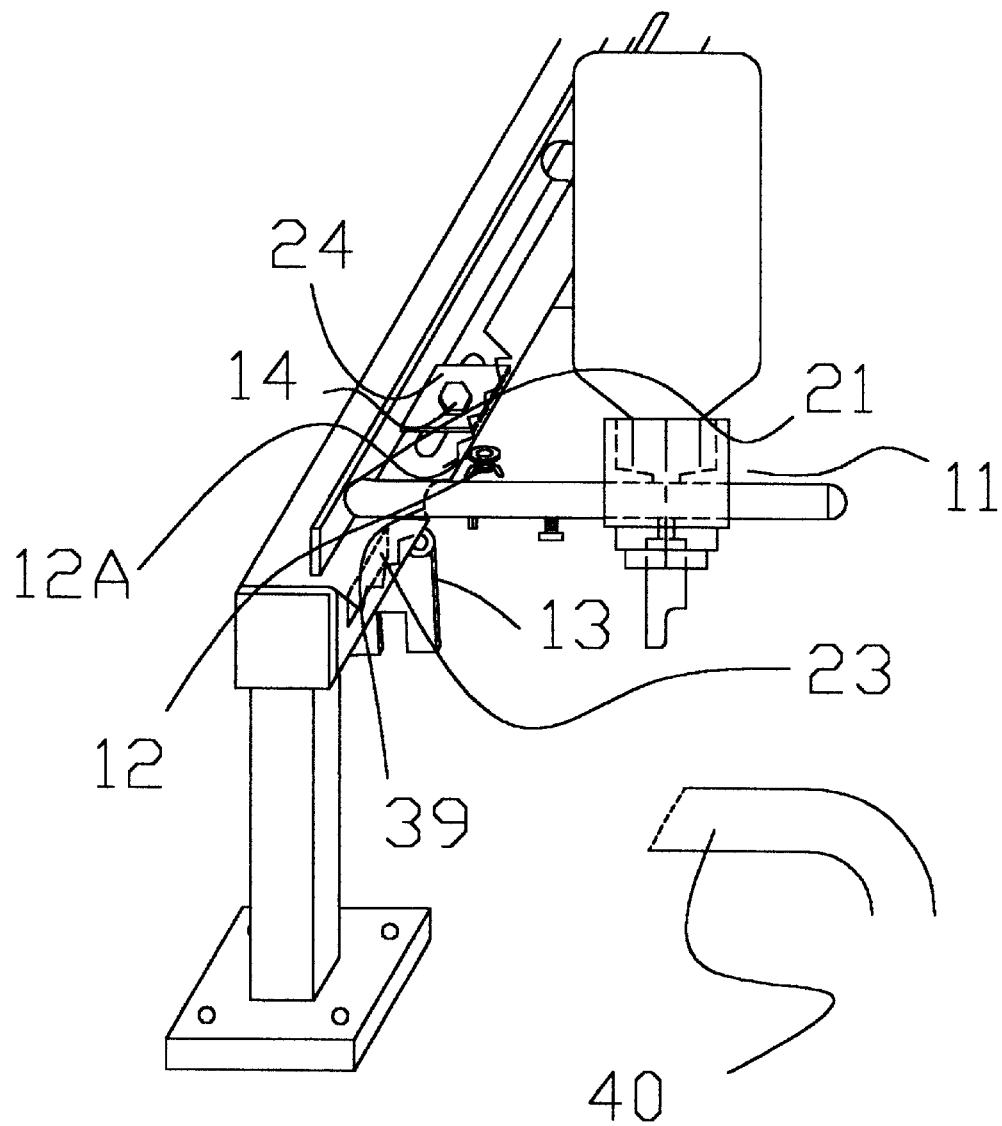
FIG. 5 is an exploded perspective view of the main frame of the dispensing machine and its relationship with the attachment of the dispensing mechanisms.
Figure 5A:
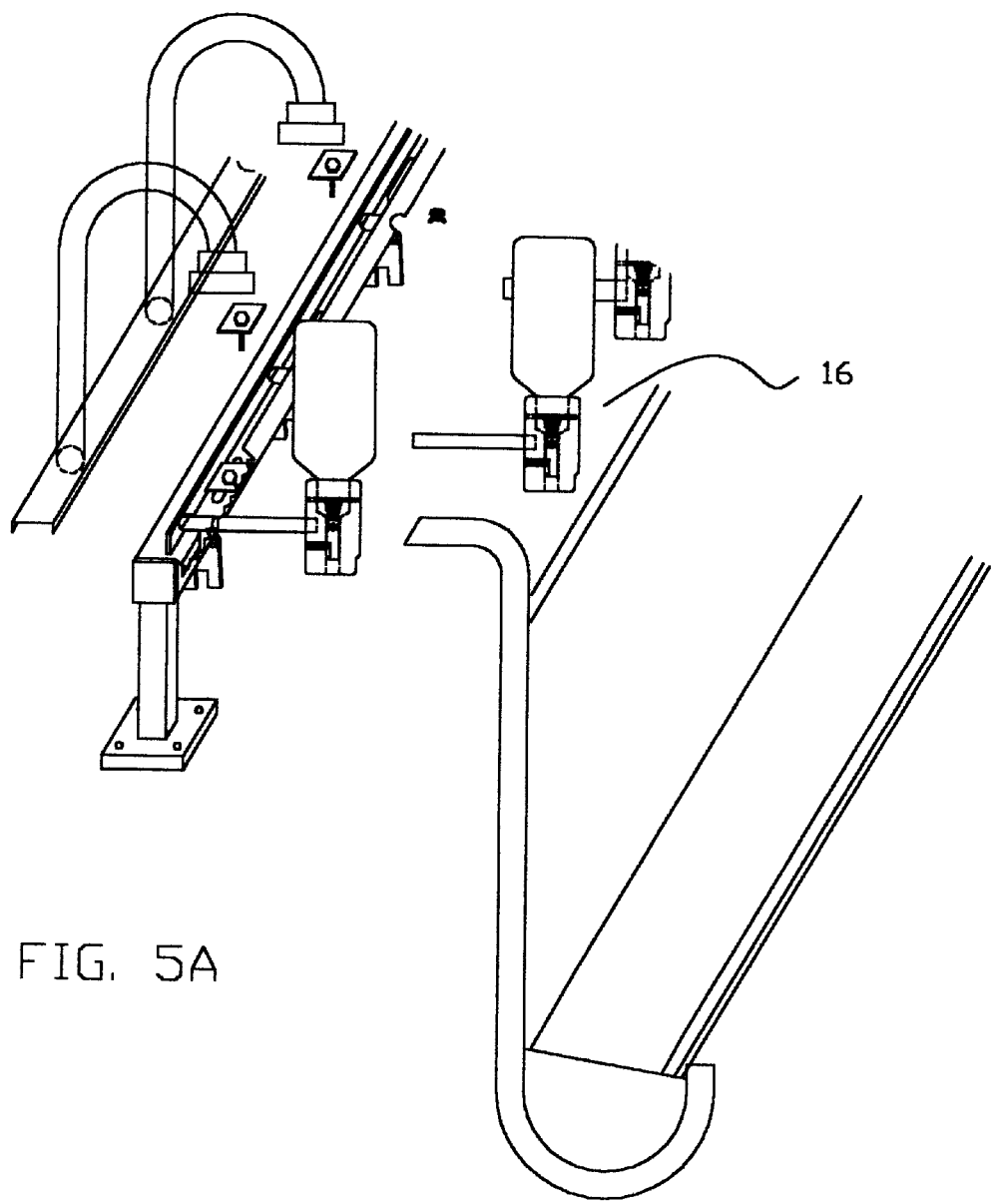
FIG. 5A is another exploded perspective view of the main frame of the dispensing machine and its relationship with the attachment of the mechanisms.
Figure 6:
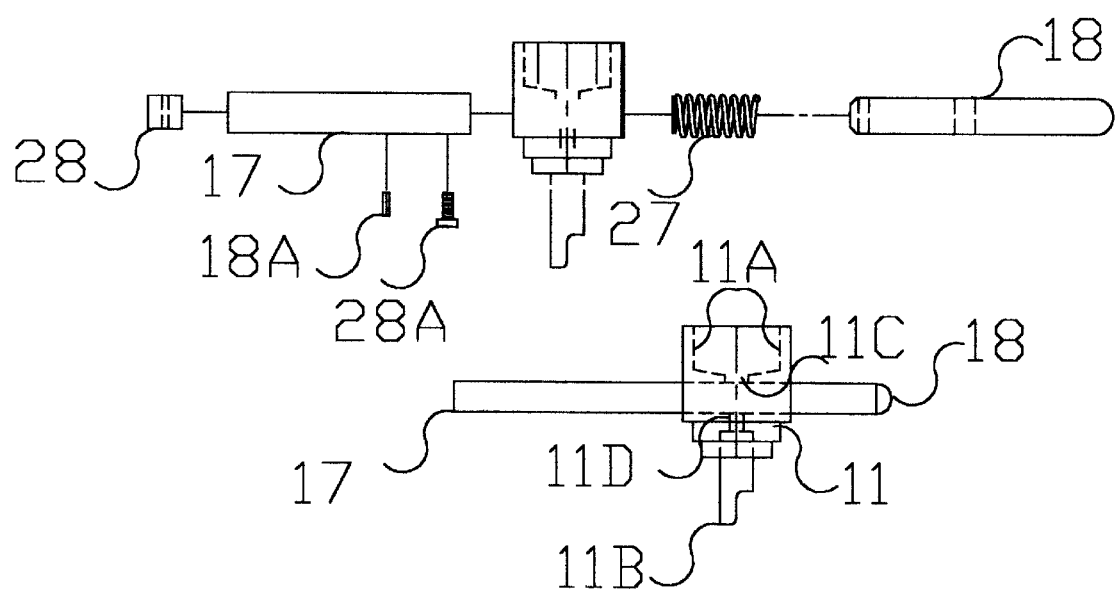
FIG. 6 are two side elevational views of the push button dispensing mechanism.
Figure 6A:
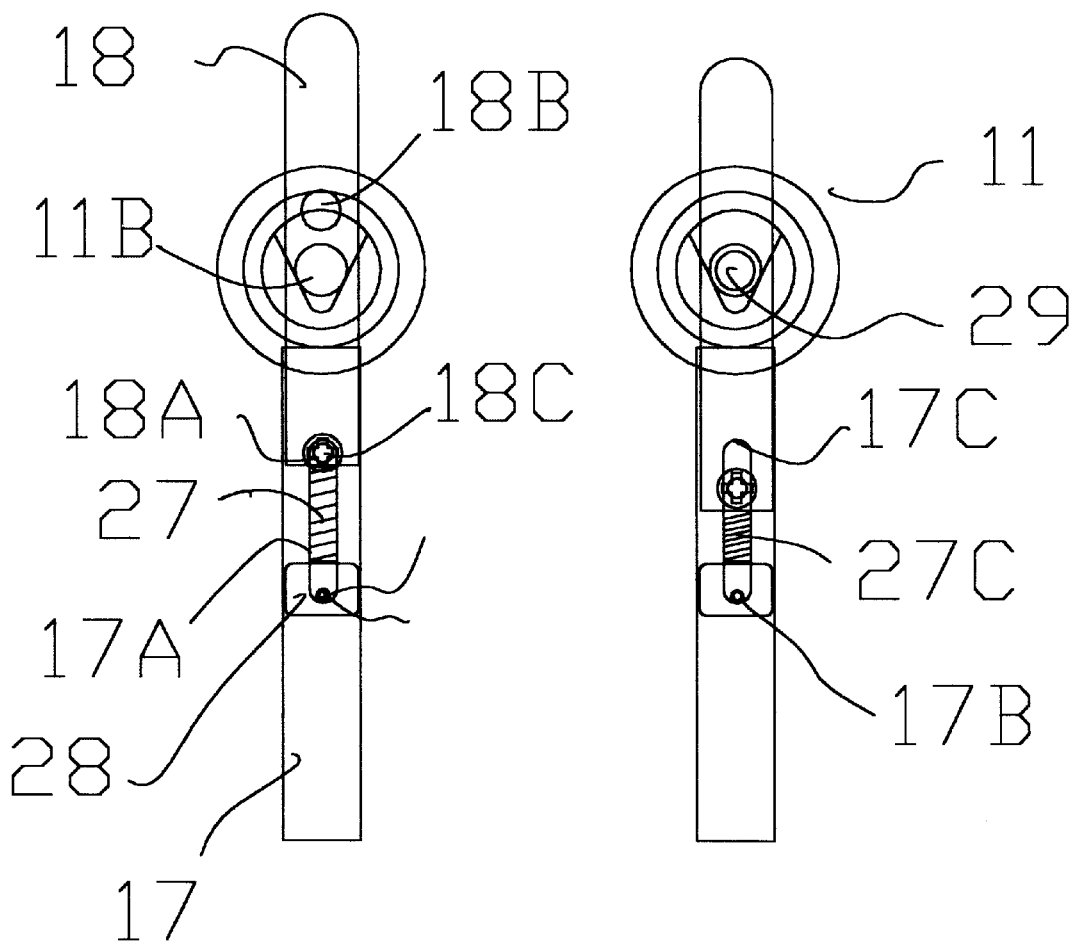
FIG. 6A are two bottom plan views of the push button dispensing mechanism showing the closed and open positions of this particular mechanism.
Figures 7, 7A:
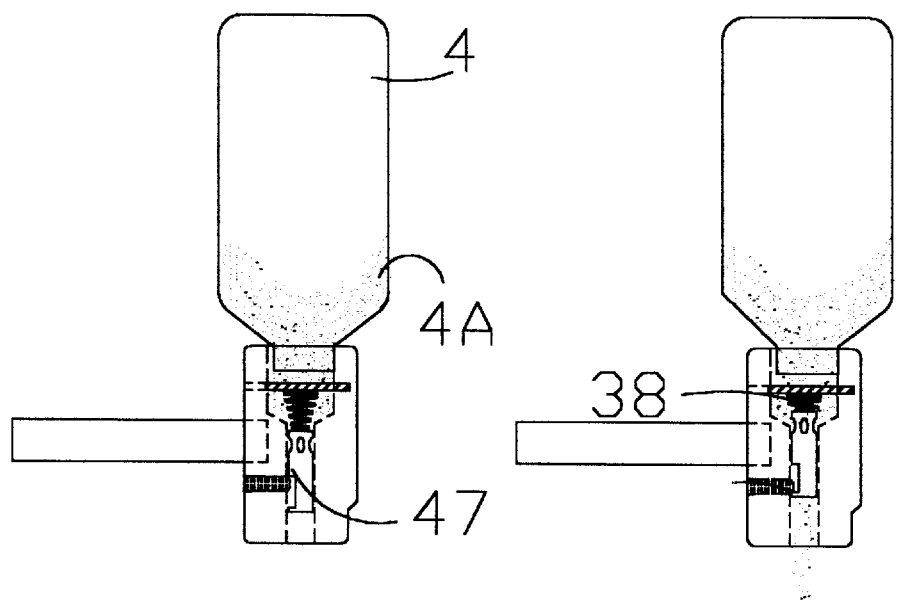
FIG. 7 is a side elevational view of the vertical dispense mechanism in the closed position, with a bottle of granular material attached.
FIG. 7A is a side elevational view of the vertical dispense mechanism in the open position allowing the granular material to be dispensed.

Referring to the FIGS. 1–7 for a clearer understanding of the invention, it may be seen that the invention contemplates a granular products dispensing apparatus. As shown in FIGS. 1 and 2, the present invention provides a candy dispensing machine with round top 2 of the machine, bottom channel 41 of the top catch bin 15, and dispensing mechanisms 11, 16. Shown is the five transparent dispensing mechanism machine. Each mechanism has an inverted bottle 4 or container such that the open hole in the bottle is fitted into the large hole 11A in the top of the dispensing mechanism. This bottle 4 is in a snug fit with the dispensing mechanism, and it shall be filled with granular and powdered products such as candy, gum, nutritional products or any similar edible granular product. The other end of the bottle or closed side is held in place by fitted piece 3. This fitted piece 3 restricts movement of the bottle 4 and its non-intentional removal. Granular material flows from bottle 4 through dispenser by mechanism 11 or mechanism 16. The end user typically will fill up some sort of receptacle, tube or container, by standing in front of a chosen dispensing mechanism 11, 16 and activating the dispenser as shown in FIGS. 6A, 7, and 7A. They may move from one dispensing mechanism to another choosing different colors or flavors of granular products. Spillage is caught by the removable catch bin 15. The catch bin 15 attaches quickly and easily to the main frame by hole 23 and secured with screw 5 and can be removed for cleaning and emptying. Edible granular products removed from catch bin 15 are not re-used.

Figure 3:
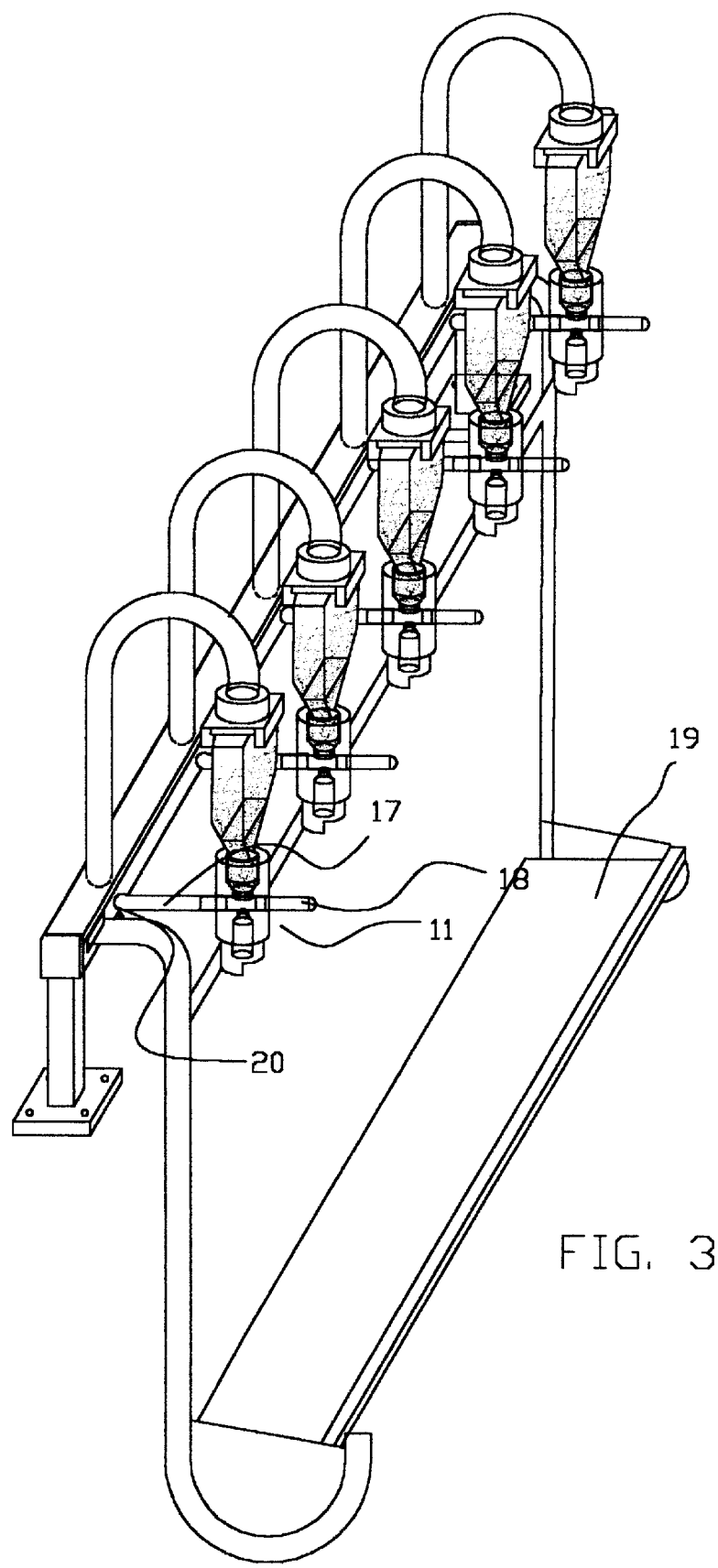
FIG. 3 is a perspective view of a five push button mechanism dispensing machine including the catch bin.
Figure 3A:
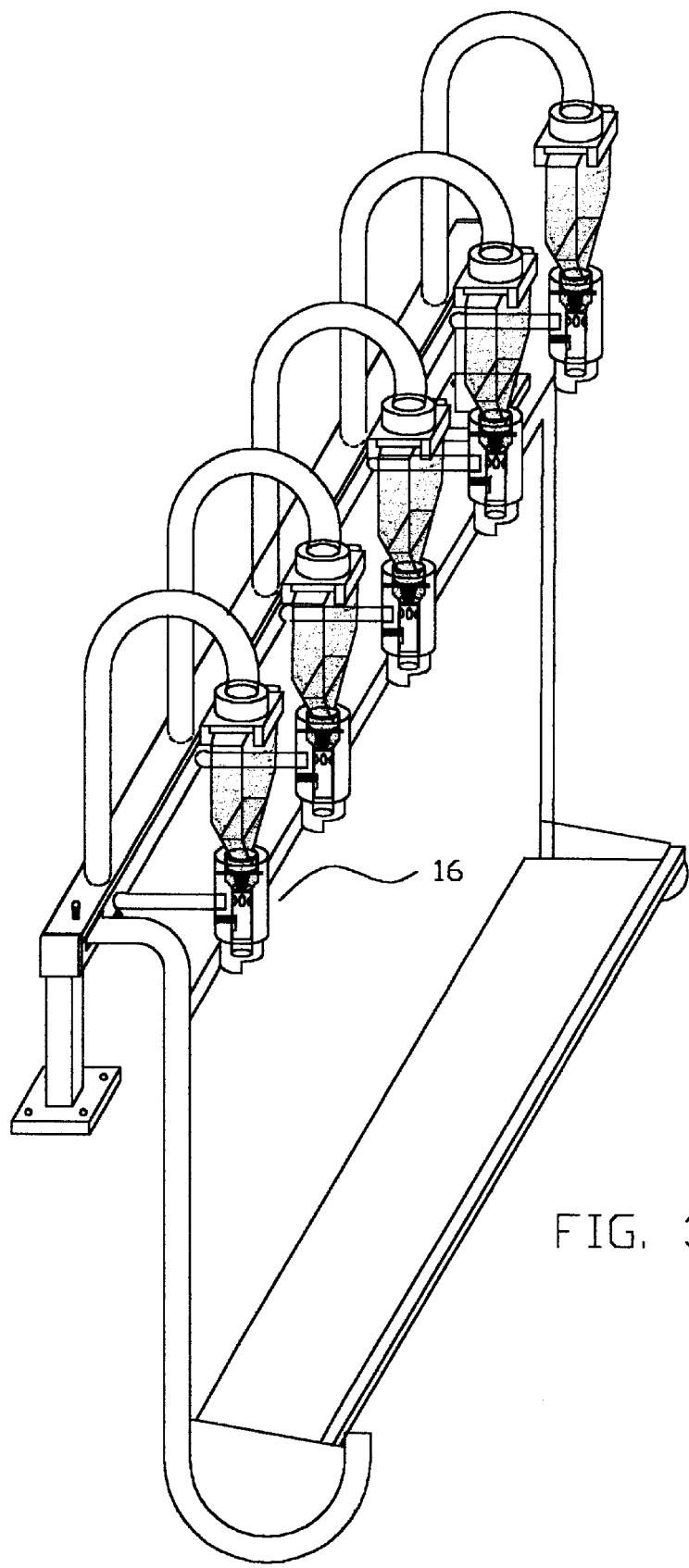
FIG. 3A is a perspective view of a five vertical dispense mechanism dispensing machine including the catch bin.

Displayed in FIGS. 3 and 3A are side views of five dispensing mechanism dispensing machines. Shown in FIG. 3 is push button dispensing mechanism 11, and shown in FIG. 3A is vertical dispense mechanism 16, mounting shaft 17 of mechanisms, removable grid 19 to clean catch bin 15 in place, insertion point 20 in the mainframe of the machine, and front surface 11 of catch bin 15. Note that the user or owner of the machine will choose one of these two styles (push button mechanism, vertical dispense mechanism) of dispensing mechanisms for their machine.

Figure 4:
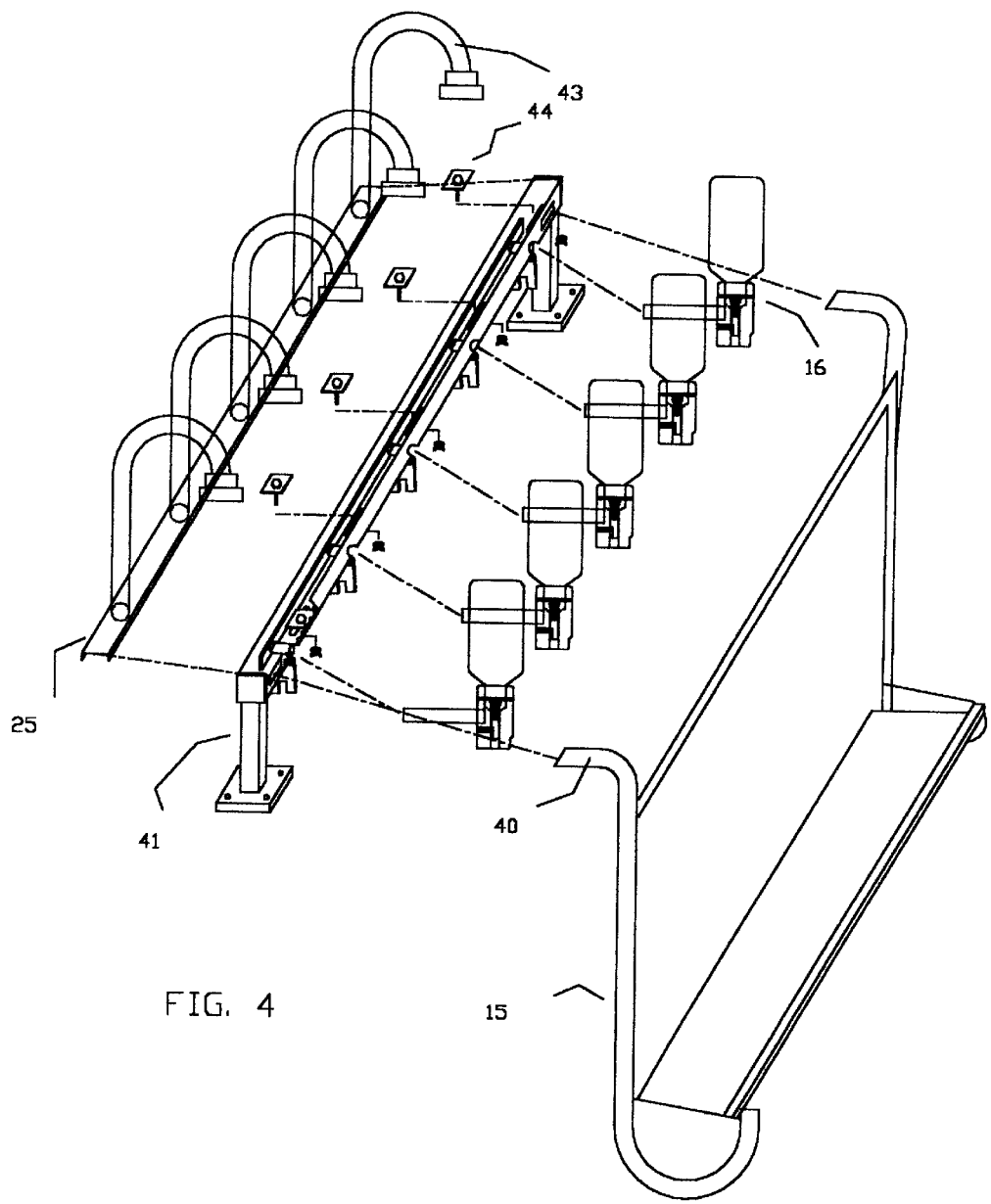
FIG. 4 is an exploded perspective view of the main components of the dispensing machines. Shown is the vertical dispense mechanisms, but note the mechanisms are interchangeable therefore the exploded view of the push button mechanism would be the same.

Displayed in FIGS. 4 and 5 are exploded side views of five dispensing mechanism dispensing machines. Catch bin 15 and the attachment end 40 of the catch bin 15 are formed for easy installation and removal from the bottom channel slots 23. Bottom channel has numerous features important for the use of the dispensing machine and its relationship between the catch bin 15, dispensing mechanism 11, 16, mounting surface, and signage. The dispensing mechanisms are inserted into the hole opening 39 in the bottom front side of the bottom channel. A corresponding lip 21 to the hole opening 39 can be seen attached to the inside of the bottom channel. The relationship between the hole 39 and lip 21 keep the inserted piece 17 of FIG. 3 of the mechanism lined up perpendicular to the container 4 full of granular material. Once inserted in bottom channel, the dispensing mechanisms are held in place by the action of hinge piece 13 or similar holding plate attached on opposite side of slot 50. Once hinged piece 13 is pressing up against support shaft 17, the slide piece 44 with attached threaded piece 14 and adjustable clamping piece 12, and 12A is slid into gap on hinge piece 13. Once slide piece 44 and threaded piece 14 are in gap, clamping piece 12 and 12A is tightened against hinge piece 13. In the tightened mode the dispensing mechanism is held firmly in place.

The top channel 25 has permanently attached curved pieces 43 and removable container end holders 3 of FIG. 1. When dispensing mechanism is in place with attached container 4, the container is held in the correct position and unable to be removed without removing the mechanism. Sign brackets in FIG. 1 are used to mount removable and optional signage from top of round top 43.

Push Button Mechanism

FIGS. 6 and 6A show two sectional views of the push button dispensing mechanism 11. FIG. 6A depicts a bottom view of push button mechanism in both a closed and an open position. The push button is held in the closed position by spring 27 and action between stop piece 28, slot 17A, pin 18A in stop piece 28, and screw 28A in end of push piece 18. In closed position, the spring 27 is held in place on one side by end of push piece 18 and screw 28A attached near the end of push button going through slot 17A in attached piece 17. The spring 27 is held on its other side by stop 28 with pin 18A. In the open position the push button 18 is depressed laterally compressing spring 27, and shown in 27A to full compression against stop 28. When push button 18 is fully depressed, a through hole 18B in push button 17 aligns with holes 11A, 11B, 11C, 11D in transparent material 11. This action allows for granular product in bottle or container 4 to flow out of opening in transparent material 11B. Attached piece 17 is a non-removable component.

Vertical Dispense Mechanism

Figure 7B:
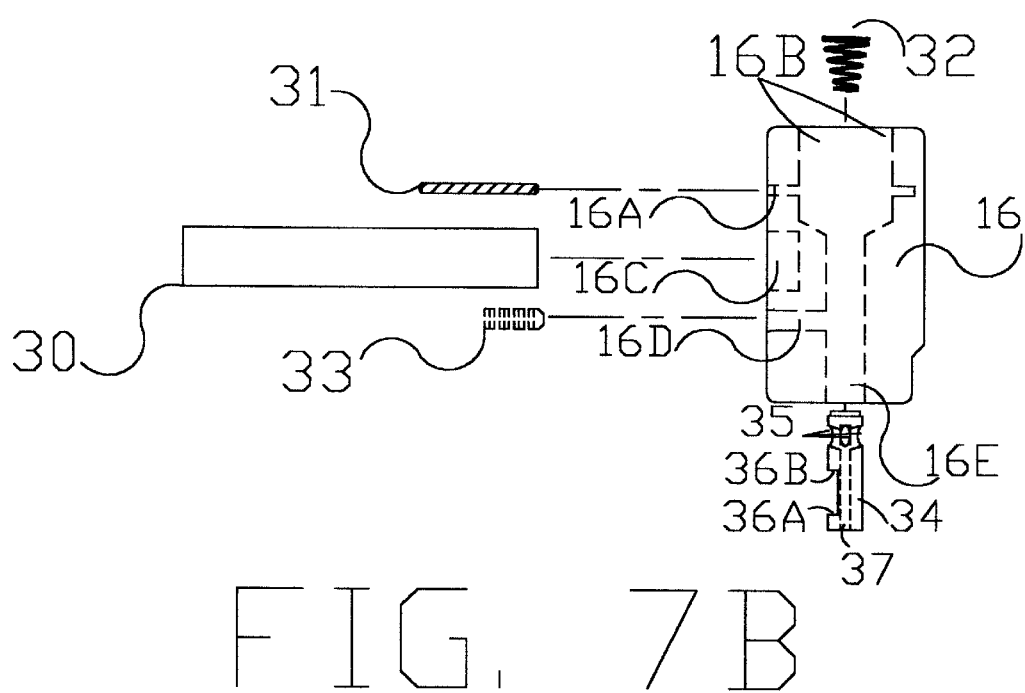
FIG. 7B is an exploded side elevational view of the vertical dispense mechanism depicting the features of this mechanism and the necessary components needed for the use of this mechanism.

FIGS. 7, 7A and 7B show sectional views of a vertical dispense mechanism 16. This mechanism has similar attached piece 30 inserted in hole 16C in transparent material 16. This attached piece 30 is the same as 17 on the push button dispenser 11 except it functions without the slot 17A. The transparent material 16 has five holes 16A, 16B, 16C, 16D, and 16E. Two holes, 16B and 16E are perpendicular to the other three. These holes extend through the entire transparent piece 16 from top to bottom. The hole on the top of the piece 16B opens large enough to accept the bottle 4 of granular material, from this point the hole is cone shaped to allow for gravity feed movement of dispensed granular material. The remainder of the hole 16E is consistent in size and extends through the rest of the transparent material and out the bottom.

The first hole 16D from the bottom is threaded to allow for a threaded piece 33 to be inserted into the hole at a pre-determined distance. Threaded piece 33 is used as stop for the vertical push piece 34. The middle or second hole 16C from the bottom extends less than one third the distance across the transparent piece. It accepts the permanently mounted attached piece 30. The third or final hole 16A on the back side of the transparent piece is the smallest hole and it extends crossways two thirds of the distance. Placed in this hole is rod 31. Rod 31 holds the large side of conical spring 32. This spring 32 is held in place under slight tension by stated rod 31 and vertical push piece 34. The tension holding spring 32 in place also keeps the vertical push piece 34 in a closed position.

Dispenser 16 is activated by the user by the action of pushing upward on the vertical push piece 34 allowing angular holes 35 to be exposed in the larger area of the through hole 16B. This action opens the valve and allows for product to flow through angular holes 35 and out straight through hole 16E in the vertical push piece 34. Vertical push piece's 34 movement in fully open/closed position is restricted by action of notch 36B for closed position and threaded piece 33. In open position bottom of notch 36A is stopped by threaded piece 33. FIG. 7A shows compression 38 of spring 32 and the release of granular product.

The present invention provides a bulk dispensing apparatus for dispensing a user-determined amount of granular product stored in bulk comprising storage bottles 4, means for confining a supply of a flowable granular material, such as candy, coffee, nutritional supplements, sugars, drink mixes, for selective discharge, and means for controlling the release of the flowable product into a receptacle. The means for controlling the release of the flowable granular product includes a push mechanism 11 or a vertical dispense mechanism 16.

The push mechanism 11 has a slide member 17 mounted for horizontal movement between a closed position and an open position. The slide member 17 has a perforate therethrough 18B. The push mechanism 11 further comprises a transparent (pellucid) unit having a recess 11A formed on an upper portion thereof and holes 11C, 11D, 11B extending from the recess 11A through the pellucid unit. The dispensing apparatus further comprises an entrant bottle 4 having a lower discharge opening, and.extending vertically above the slide member 18 and sliding adjacent the slide member 18 such that the discharge orifice is open by slide member 18 when the slide is displaced from its rest position. The entrant bottle 4 terminates within the recess 11A of the pellucid unit, and allows for connecting the entrant bottle 4 to the confining means for providing a constant supply of flowable granular product.

The vertical dispense mechanism 16 comprises a slide member 34 mounted for vertical movement between a closed and an open position. The slide member 34 has an aperture therethrough. The vertical dispense mechanism 16 includes a pellucid unit having a recess 16B formed on an upper portion thereof, and a hole 16E extending from the recess 16B through the pellucid unit. The dispensing apparatus further comprises an entrant bottle 4 having a lower discharge opening, and extending vertically above the slide member 34 and slightly adjacent the slide member 34 such that the discharge orifice is open by slide member 34 when the slide member is displaced from its rest position. The entrant bottle 4 terminates within the recess 16B of the pellucid unit, and allows for connecting the entrant bottle 4 to the confining means for providing a constant supply of flowable granular product.

The dispensing apparatus further comprises a plurality of sections assembled on a shaft and main body of one of two dispensing styles. The means for conducting flowable granular products released from the bottle 4 through a pellucid unit to a receptacle or container comprises a tube spout. The slide member comprises an external shaft portion connected to the apparatus, whereby compression of the shaft opens the orifice of the apparatus to dispense granular products. The bulk dispensing apparatus may further comprise a removable bottle, which may be removed, disposed, and replaced with a refill.

The present invention relies on gravity to move or dispense granular products. Further, the apparatus may be attached to a main body, such as by means of a molded rubber gasket. The apparatus may also be attached to a main body by means of the sliding member clamping to the main body. The apparatus may also be unique to the shape of its gaskets and bottles. The main body of the present invention may further comprise a removable catch basin 15 for means of capturing spillage. Such catch basin 15 may be easily cleaned out and sanitized.

It is to be understood that the form of the invention shown is a preferred embodiment thereof and that various changes and modifications may be made therein without departing from the spirit of the invention or scope as defined in the following claims.

What is claimed is:

1. An apparatus for dispensing a user-defined amount of flowable granular material into a container comprising:
   means for confining a bulk supply of said material, wherein said means for confining comprises a removable bottle having a discharge opening; and
   means for controlling the release of said material from said removable bottle into said container, wherein said means for controlling comprises a push mechanism comprising:
      a pellucid unit having a recess formed on an upper portion thereof and a hole extending from said recess through said pellucid unit and terminating in a discharge orifice, said bottle being positioned with said discharge opening terminating within said recess; and
      a slide member having an aperture therethrough, said slide member being mounted for horizontal movement between an open position, wherein said material flows from said recess through said aperture and out said discharge orifice, and a closed position.

2. An apparatus for dispensing granular material as described claim 1 wherein said bottle may be removed and replaced with a refill.

3. An apparatus for dispensing granular material as described in claim 1 wherein said bottle may be removed for sanitation.

4. An apparatus for dispensing granular material as described in claim 1 further comprising a main body, and means for attaching said main body to said removable bottles wherein said means for attaching comprises a molded rubber gasket.

5. An apparatus for dispensing granular material as described in claim 1 wherein said push mechanism is manually operated.

6. An apparatus for dispensing granular material as described in claim 1 wherein gravity moves said material when said slide member is in an open position.

7. An apparatus for dispensing granular material as described in claim 1 wherein said apparatus comprises a plurality of removable bottles and push mechanisms.

8. An apparatus for dispensing a granular material as described in claim 1 wherein said push mechanism further comprises a spring that is under slight tension when said slide member is in a closed position and compressed when said slide member is in an open position.

9. An apparatus for dispensing a granular material as described in claim 1 further comprising means for conducting said material from said pellucid unit to said container, wherein said means for conducting comprises a tube spout.

10. An apparatus for dispensing granular material as described in claim 1 further comprising a removable catch bin positioned for capturing spillage from said push mechanism.

11. An apparatus for dispensing a user-determined amount of flowable granular material into a container, comprising:
    means for confining a bulk supply of said material, wherein said means for confining comprises a removable bottle having a discharge opening; and
    means for controlling the release of said material from said bottle into said container, wherein said means for controlling comprises a vertical dispense mechanism comprising:
       a pellucid unit having a recess formed on an upper portion thereof and a hole extending from said recess through said pellucid unit and terminating in a discharge orifice, said bottle being positioned with said discharge opening terminating within said recess; and
       a push piece having an angular aperture said push piece being mounted within said pellucid unit for vertical movement between an open position, wherein said material flows from said recess through said angular aperture and out said discharge orifice, and a closed position.

12. An apparatus for dispensing granular material as described in claim 11 wherein said bottle may be removed and replaced with a refill.

13. An apparatus for dispensing granular material as described in claim 11 wherein said bottle may be removed for sanitation.

14. An apparatus for dispensing granular material as described in claim 11 further comprising a main body, and means for attaching said main body to said removable bottles wherein said means for attaching comprises a molded rubber gasket.

15. An apparatus for dispensing granular material as described in claim 11 wherein said vertical dispense mechanism is manually operated.

16. An apparatus for dispensing granular material as described in claim 11 wherein gravity moves said granular material when said push piece is in an open position.

17. An apparatus for dispensing granular material as described in claim 11 wherein said apparatus comprises a plurality of removable bottles and vertical dispense mechanisms.

18. An apparatus for dispensing a granular material as described in claim 11 wherein said vertical dispense mechanism further comprises a spring that is under slight tension when said push piece is in a closed position and compressed when said push piece is in an open position.

19. An apparatus for dispensing a granular material as described in claim 11 further comprising means for conducting said material from said pellucid unit to said container, wherein said means for conducting comprises a tube spout.

20. An apparatus for dispensing granular material as described in claim 11 further comprising a removable catch bin positioned for capturing spillage from said vertical dispense mechanism.

* * * * *